Figure 1:
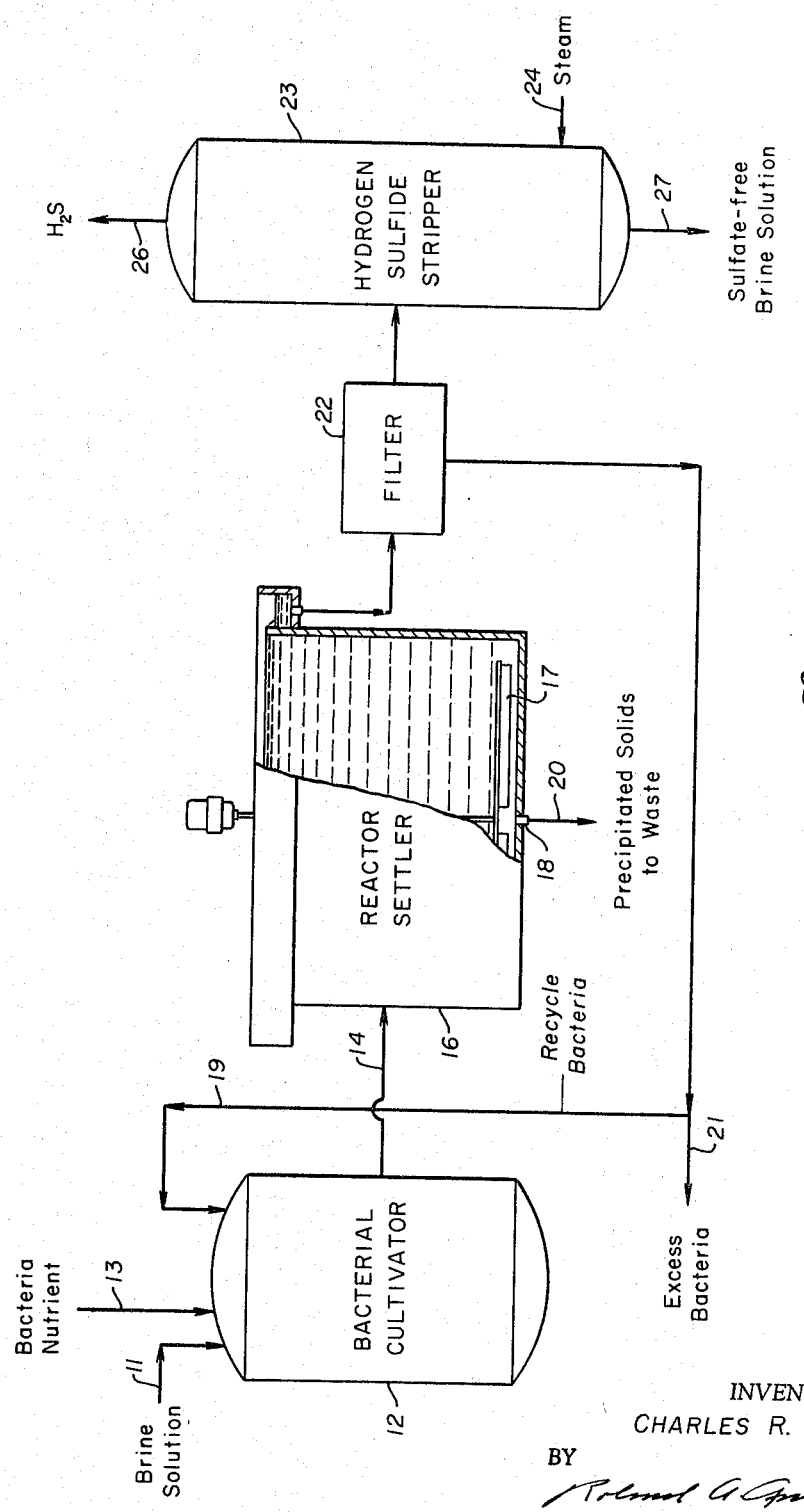

INVENTOR.
CHARLES R. WILKE

INVENTOR.
CHARLES R. WILKE
BY

ATTORNEY.

3,310,477
METHOD OF ISOLATING A DESULFOVIBRIO FOR USE IN REMOVING SULFATES FROM BRINE
Charles R. Wilke, El Cerrito, Calif., assignor to the United States of America as represented by the United States Atomic Energy Commission
Filed Nov. 27, 1964, Ser. No. 414,481
2 Claims. (Cl. 195—96)

This invention is a process for the removal of soluble sulfate ions from a brine solution.

An aqueous brine solution which is to be used in an electrolytic cell for the production of caustic and chlorine for example, will invariably have dissolved therein minor quantities of soluble sulfates. The sulfate ions, although of low concentration, will clog the diffusing membrane of a brine electrolytic cell and thus decrease the cell's efficiency of operation. Sulfate ions are also undesirable in sea water de-salinization processes because of scale formation in boiling reactors and evaporators. Because the concentration of soluble sulfates in the brine is low, any process to remove the sulfates must necessarily be highly efficient to be effective. A prior method of removing sulfate ions from brine is by precipitation of the sulfate in an insoluble form. An example would be precipitating insoluble barium sulfate using barium chloride as the precipitating agent. The precipitated sulfate is subsequently removed by continuous filtration, centrifugation, or settling. The major drawback to sulfate removal by precipitation is the cost of the precipitating agent. In the present invention raw material costs are minimized by using a bacteria which acts on the sulfate and reduces the sulfate to a sulfide, which is readily removed from the brine.

The invention consists of utilizing a bacteria, such as *Desulfovibrio aestaurii* in a batch or continuous process, wherein a bacterial nutrient medium is added to the brine solution and reacted in a mixing tank or other suitable enclosure. The bacteria in the presence of a bacterial nutrient reduces the sulfates in the brine solution to hydrogen sulfide which is subsequently removed from the brine by any of several degassing methods such as steam stripping, distillation, and the like. Prior to degassing the brine, the bacteria, and any deleterious products of bacterial metabolism, and any remaining nutrient may be removed if necessary by filtration, centrifugation, or precipitation and the bacteria may be subsequently recycled to the mixing tank for processing of fresh brine.

Thus it is an object of this invention to provide an improved process for removing sulfate ions from a brine solution.

A further object of the invention is to provide for the more economical removal of sulfate ions from a brine solution.

Another object of this invention is to provide a continuous process using bacteria to reduce sulfate ions in the brine to a gaseous sulfide which is readily removable therefrom.

It is an object of this invention to provide for the removal of soluble sulfates from brine solutions without requiring costly precipitants.

Another object of this invention is to provide a method for isolating bacteria which are particularly useful in the treatment of brine solutions.

An initial step in the practice of the invention is to obtain a purified strain of the sulfate reducing bacteria. The strain should tolerate as high a salt concentration as possible. The best sources of such bacteria strains are oil well brines or salterns and salty bodies of water.

Mud samples from which Desulfovibrio was isolated for use in the practice of this invention were obtained from salterns at Newark, California, near the shore of San Francisco bay. The black mud was found about 3 inches under the bottom of a saltern containing 13 inches of almost saturated brine.

Samples weighing approximately 2 grams each were used to inoculate a lactate growth media, and the resulting cultures were incubated at 30° C. Several types of lactate media were used. Most of the culture media contained 10% NaCl, but some had 3% or 13% NaCl. To some cultures small amounts of $Na_2SO_3$ or $Na_2S$ were added. Before inoculation, the lactate media were adjusted to have pH in the range of 7.0 to 7.5, by addition of small amounts of ascorbic acid.

The initial enrichment cultures developed quite slowly. Some enrichment cultures showed good development in three to five days, but the incubation period was usually ten days or more. Growth of bacteria was indicated by development of turbidity, and in some cultures by gas formation. The reduction of sulfate to hydrogen sulfide was indicated by the formation of iron sulfide which imparted a black color to the medium, and in some cultures caused thin black deposits on the bottles which contained the cultures. After various times of incubation, ranging from 10 days to 5 months, the original enrichment cultures were transferred into fresh media. Most of the final enrichment cultures contained only two or three distinct species. A few cultures which contained more than three species were discarded. All of the cultures contained a curved vibrio type rod organism that was suspected to be Desulfovibrio, and also a straight rod organism. Some cultures also contained a much longer (10 to 15$\mu$) thin rod organism. Separation of the first two organisms by further application of the enrichment culture method did not appear feasible. Thus several other separation techniques were tried, including solid media growth (AGAR), isolation with a deFonbrune Pneumatic micromanipulator, growth inhibitors, diffusion and the dilution method. It was by means of the diffusion method that isolation of the Desulfovibrio strain was obtained. This technique consists of taking advantage of the difference in motility of two bacterial organisms in the presence of crystal violet. Under normal conditions there appeared to be no appreciable difference in the degree of motility of the two organisms. However, 20 minutes or longer after the addition of crystal violet dye to a mixed culture, there was a very marked difference in the motility of the two. While the motility of vibrios remained practically unchanged, the rods appeared almost immobile. One loop-full of a crystal violet solution of the type used in Gram-stain reactions was normally added to 2 ml. of culture. The motility of the vibrios, estimated by observing them under a microscope, was approximately 40 to 100$\mu$/sec.

An 0.1-mm.-i.e. melting-point capillary tube was sealed at one end and then filled up with the crystal violet treated culture. A similar capillary tube was filled with a sterile culture medium. The open ends of the two capillaries were then placed in contact and fixed in position with melted paraffin wax. After a measured time interval, the capillary filled with the sterile medium was broken-off at a point 6 cm. from the open end, and the sealed-end section was incubated in a 2-ml. bottle of sterile medium. In a series of such capillaries the ends were broken-off at different time intervals after the joining of the two capillaries to obtain one in which only a few most vigorously motile bacteria have "diffused" through the 6 cm. of medium into the broken-off end. Then after the incubation, a bottle with growth was selected that contained the capillary with the shortest diffusion time.

The isolated bacterium is a Gram-negative curved rod or vibrio of varying morphology. It is very actively motile, and from its appearance the motility seems to be caused by a polar flagellum, or polar flagella. The organism reduces sulfates almost quantitatively to hydrogen sulfide. It is capable of growth in a simple media containing sodium lactate which will be subsequently discussed. There is no growth in media free of sulfates, or other oxidized sulfur compounds (sulfite, thiosulfate, etc.).

There is no growth under aerobic conditions. Sensitivity toward oxygen seems to be great; for the growth to start, the conditions must be strictly anaerobic and reducing (negative redox potential). The most favorable condition for the initiation of growth is obtained by adding 0.002 to 0.004 mole per liter of hydrogen sulfide to the medium.

Growth rate is reduced and the lag period lengthened with the increase of sodium chloride concentration in the medium, but in the absence of sodium chloride there is no growth. The organism is capable of acclimatization to higher salt concentrations, eventually approaching saturated brine solutions.

The sulfate-reducing bacteria thus isolated is the *Desulfovibrio aestaurii* species.

The sulfate-reducing bacteria thus isolated in a relatively pure strain is applied to the continuous or batch process of removing sulfate ions from a concentrated brine solution. This invention will be understood in detail by reference to FIGURE 1 of the accompanying drawing showing the preferred processing stages in practicing the invention.

As shown in the drawing, an initial step is to combine the brine 11 with the bacteria in a bacterial cultivator 12 in which the bacteria is growing. The preferred form of bacteria, as previously discussed, is the *Desulfovibrio aestaurii* strain, although it should be understood other similar sulfate reducing strains will suffice in many instances. The temperature of the cultivator 12 is maintained at 30° C.±5° C., which is the optimum temperature for the *aestaurii* bacteria.

A bacteria nutrient media 13 is added to the cultivator 12 in an amount sufficient to maintain bacteria growth. A typical bacteria nutrient will have sodium lactate mixed with water as the primary nutrient. In addition, a trace of a phosphate buffering compound such as $K_2HPO_4$ and ascorbic acid is used to control the pH, as bacterial activity at a particular temperature is dependent on the pH. The optimum pH range is 6.5 to 8.0 for the *Desulfovibrio aestaurii* bacteria at a temperature of 30° C. A trace quantity of ferric ion is also necessary for bacteria activity and this is provided by adding a trace quantity of $FeCl_3$ to the bacteria nutrient 13.

To achieve an optimum growth for the bacteria the nitrogen requirement of the bacteria should be met. This is fulfilled by adding ammonium chloride or ammonium sulfate to the bacteria nutrient 13. The molar concentration of nitrogen in the cultivator 12 should be in the range from 0.02% to 0.1%.

Standard control techniques are used in regulating the rate of sulfate reduction in cultivator 12. The density of bacteria is a function of the turbidity which becomes a controlling parameter for the rate of nutrient addition.

The brine solution 11, mixed with the bacteria and nutrient, is continuously transferred through a connecting line 14 to a circular reactor settler 16 wherein the bacteria is allowed to further react on the dissolved sulfate. The size of the reactor settler 16 is dependent on the rate of brine throughput and the quantity of sulfate to be reduced. The reactor-settler 16 is any of several designs, such as a Dorr or Hardinge Settler, having a rotating blade 17 at the bottom of the settler 16 which concentrates any precipitated solids 20 towards the midpoint where it is withdrawn through an opening 18 and disposed to waste.

The brine solution is withdrawn from the upper rim of settler 16 and passed to a filter 22 which removes the bacteria from the brine. Other separation means can be used such as centrifugation or precipitation. It is possible in some instances, such as sea-water desalinization processes, that the bacteria would not be removed from the brine.

If the rate of withdrawal of solution from the cultivator 12 is such as to lower the amount of bacteria therein below the optimum level, a portion 19 of the bacteria which is withdrawn from the filter 22 may be returned to the cultivator 12, the remainder 21 of the withdrawn bacteria being removed from the system.

The brine solution, now free of bacteria, is withdrawn from the filter 22 and passed to a hydrogen sulfide stripper 23 which is connected to a steam source 24. Stripper 23 functions to remove the hydrogen sulfide 26 produced by the bacterial reduction of the sulfate ions in the brine solution 11. The sulfate-free brine solution 27 is then withdrawn from the base of the stripper 23 for utilization in the customary manner.

The invention may be better understood by reference to the following example which demonstrates the successful removal of sulfate ions from brine by means of the invention.

*Example*

To determine the basic sulfate reduction rate and the effectiveness of the *Desulfovibrio aestaurii* bacteria strain the following procedure was used.

A nutrient medium was obtained having the following ingredients:

| | Weight (grams) |
|---|---|
| $K_2HPO_4$ | 0.5 |
| $NH_4Cl$ | 1.0 |
| $MgSO_4 \cdot 7H_2O$ | 2.0 |
| $Na_2SO_4$ | 1.0 |
| $CaCl_2 \cdot 2H_2O$ | 0.1 |
| $FeCl_3 \cdot 4H_2O$ | trace |
| Sodium lactate (60% syrup) | 6.0 |
| Peptone | 1.0 |
| Yeast extract | 1.0 |
| NaCl | 100.0 |

These ingredients were added to a 1000 ml. Erlenmeyer flask and brought to volume with distilled water and thoroughly mixed. Twenty ml. of the pure strain of Desulfovibrio, obtained by the previously described method, was inoculated into the nutrient medium and mixed. The inoculated medium was then distributed into glass stoppered bottles of 60 ml. capacity which were incubated for various lengths of time at 30° C. At the end of a period of time the sulfide content was measured using standard titrating techniques consisting of adding 0.1 N iodine to the culture and back titrating with thiosulfate, using starch as an indicator. A bacterial count was taken with a Petroff-Hausser counting chamber. The results are tabulated in Table A:

TABLE A

| Time of incubation (days) | Cumulative H$_2$S produced (mole/liter) | Bacterial count (No. of cells/ml.) | Logarithm of No. of cells/ml. | Sulfate concentration (mole/liter) |
|---|---|---|---|---|
| 0.04 | 0 | 1.38×10$^6$ | 6.139 | 0.0162 |
| 0.22 | 0.00005 | 1.75×10$^6$ | 6.243 | 0.01615 |
| 0.44 | 0.00005 | 1.88×10$^6$ | 6.273 | 0.01615 |
| 0.92 | 0.00015 | 4.07×10$^6$ | 6.610 | 0.01605 |
| 1.38 | 0.00035 | 2.00×10$^7$ | 7.301 | 0.01585 |
| 1.60 | 0.0004 | 3.60×10$^7$ | 7.556 | 0.0158 |
| 1.98 | 0.0005 | 4.86×10$^7$ | 7.687 | 0.0157 |
| 2.36 | 0.00135 | 8.30×10$^7$ | 7.919 | 0.01485 |
| 2.56 | 0.0014 | 9.44×10$^7$ | 7.975 | 0.0148 |
| 2.94 | 0.0028 | 1.69×10$^8$ | 8.228 | 0.00139 |
| 3.23 | 0.0030 | 2.38×10$^8$ | 8.377 | 0.0132 |
| 3.53 | 0.0035 | 2.54×10$^8$ | 8.405 | 0.0127 |
| 3.96 | 0.0040 | 2.56×10$^8$ | 8.408 | 0.0122 |
| 4.25 | 0.00525 | 2.60×10$^8$ | 8.415 | 0.01095 |
| 5.92 | 0.0069 | 2.56×10$^8$ | 8.408 | 0.0093 |
| 6.04 | 0.0075 | 2.22×10$^8$ | 8.346 | 0.0087 |
| 7.10 | 0.0090 | 2.22×10$^8$ | 8.346 | 0.0072 |
| 8.23 | 0.0110 | 2.66×10$^8$ | 8.425 | 0.0052 |
| 10.15 | 0.0135 | 2.54×10$^8$ | 8.405 | 0.0027 |
| 13.19 | 0.0153 | 2.58×10$^8$ | 8.412 | 0.0009 |
| 18.17 | 0.0160 | 2.62×10$^8$ | 8.418 | 0.0002 |
| 21.12 | 0.0163 | 2.40×10$^8$ | 8.380 | 0.0 |
| 25.00 | 0.0166 | 2.44×10$^8$ | 8.387 | 0.0 |

Figure 2:
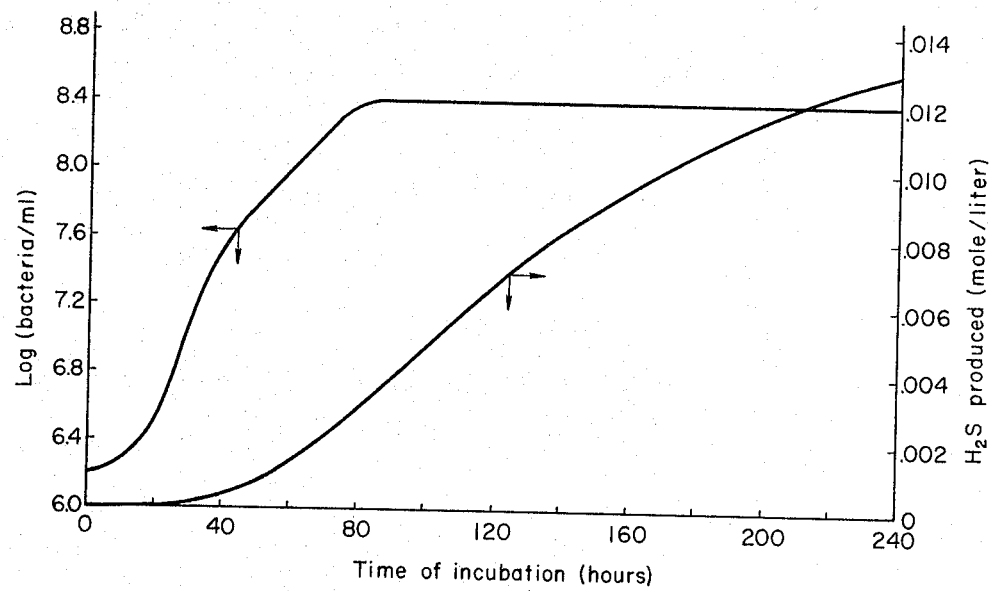

The results listed in Table A are plotted in FIGURE 2 of the drawing, and show the typical exponential growth up to 80 hours of incubation. After 80 hours the bacteria count levels off at about 2.5×10$^8$ cells/ml. After 18 days of incubation the sulfate concentration has dropped to essentially zero, with the cumulative H$_2$S production being approximately equal to the initial sulfate concentration (0.0162 ml./liter).

The growth rate, $k$, of a bacteria is given by the standard differential equation:

$$k = \frac{1}{n}\frac{dn}{dt} \quad \text{Equation 1}$$

where $n$ is the number of bacteria, and $t$ is time.

The basic equation relating the fermentation product to the growth rate and the bacterial density is:

$$\frac{d(H_2S)}{dt} = \alpha\frac{dn}{dt} + \beta n \quad \text{Equation 2}$$

where $d(H_2S)/dt$ represents the fermentation product and $\alpha$ and $\beta$ are constants fixed by the organism, the nutrient and the temperature of reaction, as will be hereinafter discussed.

In the present case, assuming the sulfate is all converted to sulfide, H$_2$S, Equation 2 becomes:

$$\frac{d(SO_4^-)}{dt} = \alpha\frac{dn}{dt} + \beta n \quad \text{Equation 3}$$

Substituting Equation 1 in Equation 3:

$$\frac{1}{n}\frac{d(SO_4^-)}{dt} = \alpha k + \beta \quad \text{Equation 4}$$

Figure 3:
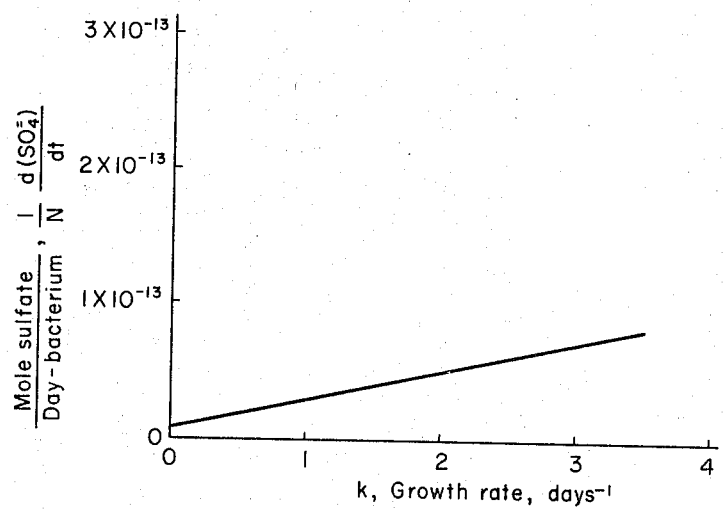

Based on experimental data of Table A and FIGURE 2 the rate of sulfate utilization per bacterium per day, $$\frac{1}{n}\frac{d(SO_4^-)}{dt}$$

is calculated and plotted graphically as a straight line function of $k$, the growth rate. This is shown in FIGURE 3 where $k$ is the abscissa axis, and the sulfate utilization rate per bacterium per day is the ordinate axis. According to Equation 4 the slope of the line on FIGURE 3 is equal to $\alpha$, which in this case is $2.2\times10^{-14}$, and $\beta$ is the zero point ordinate intercept, which is equal to $7.0\times10^{-15}$.

Thus Equation 4 for the described growth medium used at 30° C. becomes:

$$\frac{1}{n}\frac{d(SO_4^-)}{dt} = 2.2\times10^{-14}k + 7\times10^{-15} \quad \text{Equation 5}$$

In a continuous process to reduce the sulfate, a continuous turbidistat type cultivator usually operates in the exponential growth phase denoted by the sharp upswing in bacteria count of FIGURE 2. Thus there is no dependence of sulfate reduction rate on the bacterial growth rate because the bacteria population would be maintained at the highest possible level compatible with exponential growth. In such a continuous cultivator the sulfate reduction rate can then be approximated by knowing $k$ is equal to 1.157 day$^{-1}$ and $n$, the bacteria count, is approximately 7.5×10$^{10}$ cells/liter, which gives a sulfate reduction rate, from Equation 5, equal to 0.00244 mole/liter/day.

While the invention has been herein disclosed with respect to a particular embodiment, numerous modifications and variations are possible within the spirit and scope of the invention and it is not intended to limit the invention except as defined by the following claims.

What is claimed is:

1. A method of isolating a bacterial strain of the genus desulfovibrio for use in removing sulfates from brine solutions, the steps comprising adding a saline growth medium to a natural sample from a salty environment which contains said bacteria strain whereby growth of a culture of the salt tolerant bacteria strains in said sample is induced, adding an inhibitor to said culture which depresses motility of bacteria, said inhibitor being of a type which affects the motility of desulfovibrio less strongly than that of other salt tolerant bacteria strains, disposing said culture containing said inhibitor adjacent a body of sterile culture medium, and separating a portion of said sterile culture medium from the remainder thereof after a period of time, said separated portion being remote from the juncture of said sterile culture medium with the original culture whereby the separated portion contains only the relatively more motile desulfovibrio bacteria.

2. A method of isolating the bacterial strain desulfovibrio as described in claim 1 wherein said inhibitor is crystal violet.

References Cited by the Examiner

UNITED STATES PATENTS

| 2,574,070 | 11/1951 | Strawinski | 195—3 |
| 2,641,564 | 6/1953 | Zobell | 195—3 |
| 2,902,418 | 9/1959 | Burns | 204—128 |

A. LOUIS MONACELL, *Primary Examiner.*

L. M. SHAPIRO, *Assistant Examiner.*